A. S. CUBITT.
ELECTRIC HEATER.
APPLICATION FILED JAN. 19, 1911.

1,055,882. Patented Mar. 11, 1913.

Witnesses:
George W. Tilden
J. Ellis Glen

Inventor:
Archibald S. Cubitt,
by
His Attorney.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

ELECTRIC HEATER.

1,055,882.  Specification of Letters Patent.  Patented Mar. 11, 1913.

Application filed January 19, 1911. Serial No. 603,497.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Electric Heaters, of which the following is a specification.

This invention relates to electric heaters such as cooking utensils and has for its object the provision of a device of this character in which the heating operation is performed in a rapid, safe and efficient manner.

My invention relates more particularly to electric heaters of the type in which steam or other vapor is employed for performing the cooking. Devices of this character have been employed for cooking eggs by steaming.

One of the objects of my invention is to produce an egg steamer which is electrically heated and in which provision is made for cooking the eggs to a predetermined degree and at the same time preventing them from being burned.

Other objects and purposes of my invention will appear in the course of the following specification in which I have shown my invention embodied in concrete mechanism for purposes of illustration.

Figure 1:
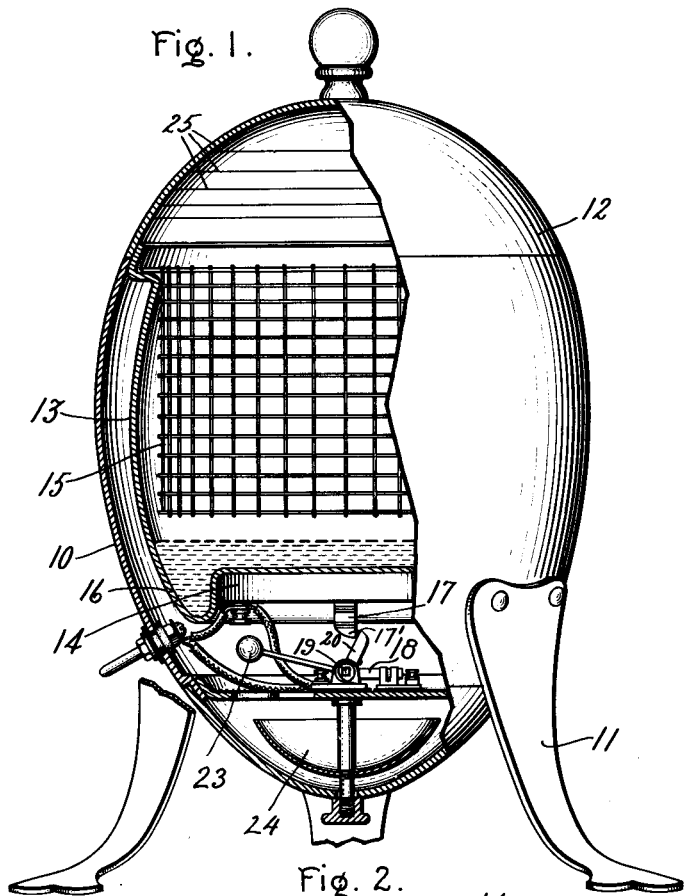
Figure 2:
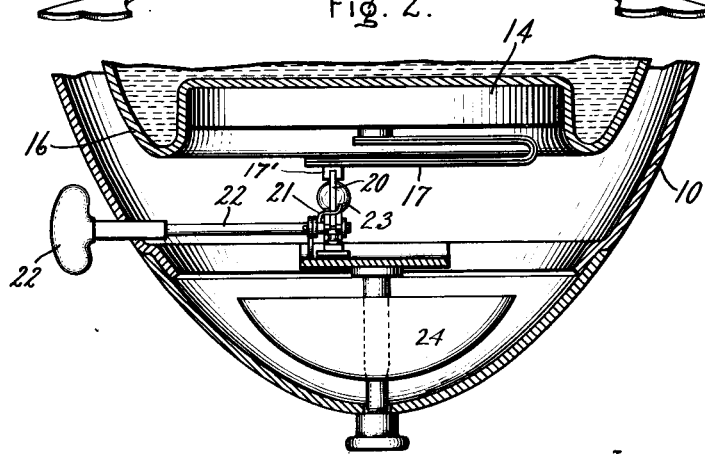

In the accompanying drawing illustrating one embodiment, Figure 1 is an elevation of my device partly in section; and Fig. 2 is an enlarged sectional view of the lower portion of my device.

Referring to the drawing, 10 represents the outside casing of my device. This may be of any desired shape, but for purposes of illustration I have shown it egg-shaped.
This casing is provided with legs 11 for supporting it in a vertical position and with a cover 12, as shown. Within the casing 10 and spaced therefrom is an inner casing 13 which extends part way down the interior of the vessel and to the bottom of which is secured the heating unit 14. Within this inner casing is mounted the basket 15. This basket is for holding the eggs or other material out of contact with the water so that the material will be in contact with the steam. The basket may be of wirework, as shown, and rest upon the shoulder of inner casing 13. This inner casing is shaped so as to provide a pocket 16 for containing water after the main body of the water has been evaporated. In order to effect this result, the flat portion of the bottom which is engaged by the heating unit is elevated so as to leave a depression or groove around its circumference. From this construction it will be obvious that when the water in contact with the flat portion, which is the effective radiating surface of the heating unit, is evaporated, the heating unit will quickly become very hot. The material inside to be cooked, which in this case is one or more eggs, might be burned, but the water pocket around the unit provides for the generation of a certain amount of steam after the main body of water has been evaporated but before the current is cut off by means hereinafter described. The heating unit 14, which may be of any desired type, but which I have shown as of the flat type, since this is very convenient in the particular construction of my device herein disclosed, is arranged to be open circuited when it reaches a predetermined temperature. The temperature at which the circuit is opened will be that to which the heater will rise when there is no longer water in contact with its effective radiating surface for keeping it cool. Under these conditions it will rise in temperature very rapidly. In order to open the circuit under these conditions I have provided the thermostatic member 17, mounted in contact with the central portion of the heating unit. This thermostatic member may be U-shaped, as shown, so as to provide an effective movement for opening the circuit and is provided with a lug 17'. Switch member 18, pivoted at 19, is arranged to open the circuit of the heating unit. This switch member is provided with a portion 20 which engages the lug 17' of the thermostatic member and is held in closed position thereby. A spring 21 presses against the member 20 so as to normally force the switch open. A key 22 extends out through the casing so as to provide means for closing the switch. As thus constructed, when the key 22 is turned the switch member 18 is turned to closed position, as shown in Fig. 1, and the member 20 holds it in place by bearing against the lug 17' of the thermostatic element, providing, of course, the temperature in the heating unit is not excessive. If the temperature rises above a predetermined point the end of the thermostatic element will bend upward and release the switch. In order to provide a signal so as to call the user's attention to the fact that the circuit is open, I provide a hammer 23 which moves with the switch member, and a bell 24 which is engaged by the hammer when the switch is opened.

The operation of my device is as follows: When it is desired to steam eggs, for instance, the desired number of eggs are placed in the basket 15. The water is then poured into the bottom of the receptacle, as shown in Fig. 1. The degree to which the eggs are to be steamed is controlled by the amount of water in the receptacle. The cover 12, which is used as a cup to measure the amount of water in the heater, may be graduated as shown at 25 for indicating the proper amount. The current being turned on by means of the key 22, steam will be generated in the receptacle, and the eggs cooked. When the water in contact with the flat portion of the bottom, that is, in contact with the effective radiating surface, is evaporated, the eggs are cooked to the desired degree. A very short time after the water has evaporated, the circuit is opened by the thermostat. In order to prevent the eggs from being burned during this interval I provide the water pocket 15 which will still contain water for steaming the eggs for a short period until the circuit is opened. As soon as the temperature becomes excessive in the heating unit the switch opens and the gong rings.

In accordance with the patent statutes I have shown my invention embodied in concrete form and as operating in a specified manner, but it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electrically heated fluid receptacle, of thermostatic means for opening the circuit of the heater when a definite quantity of water which is less than the whole amount contained therein has been evaporated.

2. An electric water heater comprising a fluid receptacle and an electric heating unit therefor, said receptacle being provided with means whereby water is left in the receptacle after the water in direct contact with the effective heating surface of said unit has been evaporated, and thermostatic means for automatically opening the circuit after said evaporation.

3. An electric water heater comprising a fluid receptacle, a heating unit in contact therewith, and a thermostatic switch in contact with the heating unit, said receptacle being provided with a pocket extending below the unit.

4. An electric water heater comprising a fluid receptacle, a heating unit in contact with the bottom thereof, and a thermostatic switch for opening the circuit of the heating unit, said receptacle being depressed below the level of the unit so as to hold water after the water in the bottom of the receptacle has evaporated.

5. The combination with a fluid receptacle, of an electric heating unit therefor, a thermostatic switch for opening the circuit thereof, and a pocket in said receptacle for containing water after the water in said receptacle has lowered to the level of the heating unit.

In witness whereof, I have hereunto set my hand this 12th day of January, 1911.

ARCHIBALD S. CUBITT.

Witnesses:
W. MAYNARD,
J. C. MUSGROVE.